United States Patent [19]

Gresens

[11] Patent Number: 4,657,115
[45] Date of Patent: Apr. 14, 1987

[54] METHOD AND APPARATUS FOR THE AUTOMATIC LUBRICATION OF THE LINKS OF A CONTINUOUSLY MOVING MATERIAL TRANSPORT CHAIN IN A TENSIONING MACHINE

[75] Inventor: Harry Gresens, Benningen/Neckar, Fed. Rep. of Germany

[73] Assignee: Bruckner Trockentechnik, Leonberg, Fed. Rep. of Germany

[21] Appl. No.: 854,528

[22] Filed: Apr. 22, 1986

[30] Foreign Application Priority Data

Jun. 28, 1985 [DE] Fed. Rep. of Germany ....... 3523254

[51] Int. Cl.⁴ .............................................. F01M 1/08
[52] U.S. Cl. .................................... 184/6.1; 184/15.3
[58] Field of Search ...................... 184/6.1, 15.1, 15.2, 184/15.3; 417/14

[56] References Cited

U.S. PATENT DOCUMENTS 3,463,268  8/1969  Krause ................................. 184/6.1
3,804,201  4/1974  Rombi et al. ........................ 184/6.1
4,209,079  6/1980  Marchal et al. ...................... 184/6.1

FOREIGN PATENT DOCUMENTS 2153735  3/1973  Fed. Rep. of Germany ..... 184/15.3
126429   4/1919  United Kingdom ................. 184/6.1
542891   1/1977  U.S.S.R. .............................. 184/6.1

Primary Examiner—Leonard E. Smith
Attorney, Agent, or Firm—C. O. Marshall, Jr.

[57] ABSTRACT

The invention relates to a method and apparatus for the automatic lubrication of the links of continuously moving material transport chains in a tensioning machine. The supply of lubricant is switched on and off for the duration of at least one complete circuit of the transport chain as a function both of the speed at which the chain goes round and the prevailing temperature in the tensioning machine, while an pulse count signal which is proportional to the speed at which the chain goes round and is used to control the supply of lubricant is multiplied by a multiplication factor formed from an actual value for the temperature, so that optimum lubrication of the chain links is provided.

9 Claims, 2 Drawing Figures

METHOD AND APPARATUS FOR THE AUTOMATIC LUBRICATION OF THE LINKS OF A CONTINUOUSLY MOVING MATERIAL TRANSPORT CHAIN IN A TENSIONING MACHINE

The invention relates to a method for the automatic lubrication of the links of a continuously moving material transport chain in a tensioning machine for drying and/or fixing lengths of textile material, according to the preamble to claim 1. The invention further relates to apparatus for carrying out this method.

Various methods are already known in the art by which the continuously moving material transport chains (tensioning chains) or the links thereof can be lubricated from time to time during operation. For lubrication various suitable means can be used, such as for example spray nozzles, oil spray fields or the like, with which preferably fluid lubricant is applied to the chains and if necessary to the guide rails thereof. Both the duration of the application of lubricant and the interval of time between two spraying operations are set. The lubrication time and the interval of time can be monitored according to one embodiment with the aid of adjustable time relays.

Another possibility for the automatic lubrication of such continuously moving material transport chains is known from German Offenlegungsschrift No. 21 53 735. According to this publication the lubricating means are switched on and off periodically as a function of the speed at which the chain moves round and the length of the chain by means of a control arrangement with a counter in such a way that the lubrication time is measured exactly for the time it takes the chain to go round once so that the entire chain can be lubricated once during each lubrication period.

However, it has been shown that for optimum lubrication and thus for the longest possible working life of the material transport chains not only the speed at which the chain goes round but also the temperatures in the tensioning machine are important. In fact, tensioning machines frequently operate with greatly varying temperatures, and relatively high temperatures considerably reduce the effectiveness of the lubricant delivered.

The object of the invention, therefore, is to provide a method of the type set out in the preamble to claim 1 (and apparatus suitable for carrying out the method) in which optimum lubrication of the material transport chains is ensured taking account of the speed at which the chain goes round and also taking into consideration the prevailing temperature in the tensioning machine.

This object is achieved according to the invention by the features set out in the characterising part of claim 1.

In this method according to the invention it is not sufficient—as in the known method described last above—for the pulses proportional to the speed of the chain to be counted and the individual lubrication points on the transport chains to be activated accordingly, but rather the temperature inside the tensioning machine is also measured and from the actual value which is found for the temperature a multiplication factor is produced which is superimposed on the pulse count signal which is proportional to the chain speed. The product of multiplication factor times pulse count signal is delivered as the total signal to the counter (pulse signal counter) which then upon reaching a predetermined target figure emits a control signal to switch on the supply of lubricant. In this way in the method of lubrication according to the invention not only the speed at which the material transport chains go round but also the temperature prevailing inside the tensioning machine and acting upon the transport chains and the lubricants therefor are used for the formation of the control signal in order to switch on the supply of lubricant to the transport chains or the links thereof for at least one full circuit of the chain. In this way the material transport chains can be lubricated in an optimum manner, that is to say they are neither over-lubricated nor under-lubricated.

It is also advantageous if the temperature is measured at several measuring points in the tensioning machine, whereby higher temperatures result in a higher multiplication factor and vice versa.

With this method the temperature measuring points in the tensioning machine can be associated with adjustable limit contacts which in each case supply the current actual values for the temperature which are used for the formation of the multiplication factor at the time in order to superimpose the latter onto the pulse count signal. Accordingly if, for example, a relatively high temperature is measured at one temperature measuring point in the tensioning machine, then using the actual value obtained for the temperature a correspondingly high multiplication factor for the pulse count signal is formed which in turn leads to a correspondingly high total signal which is supplied to the counters, as a result of which the predetermined target figure is reached comparatively quickly. This means therefore that when the temperature in the tensioning machine is relatively high the predetermined target figure is reached more quickly than when the temperature is relatively low. Equally, the target figure is reached relatively quickly when the material transport chains move at relatively high speed, and vice versa. When the target figure is reached in the counter, the supply of lubricant is switched on by means of the control signal until the transport chains have exactly completed one full circuit or several full circuits (depending upon the desired lubrication intensity) without any over-lubrication or under-lubrication of the chain links. After this accurately measured lubrication operation the supply of lubricant is shut off, and after the completion of each lubrication operation the counter is preferably reset to the starting position so that the lubrication time interval which is fixed by the predetermined target figure begins again.

A particularly simple and reliable measurement of temperature can be achieved by measuring the air temperature in the tensioning machine, because this acts essentially on the transport chain links and the lubricants therefor.

In the case of continuous drying and fixing of lengths of textile material it has also proved advantageous to measure the temperatures in the second half of the tensioning machine—viewed in the material transport direction—because experience has shown that the highest temperatures occur there. If a tensioning machine with a plurality of heat treatment fields arranged one behind the other is used, then the temperature is measured in at least one of the last heat treatment fields (preferably in several).

Apparatus for automatic lubrication of the links of continuously moving material transport chains in a tensioning machine for carrying out the method according to the invention can be constructed according to the preamble to claim 6, and according to the invention it is characterised by the features set out in the characterising portion of claim 6.

This lubricating apparatus according to the invention can be of comparatively simple construction whilst providing optimum lubricating work, and the consumption of lubricant can be limited to the minimum quantities necessary. It is also advantageous that the lubricating apparatus can also be attached or installed at a later stage on existing tensioning machines.

The invention will be explained below with the aid of the drawings, in which.

Figure 1:
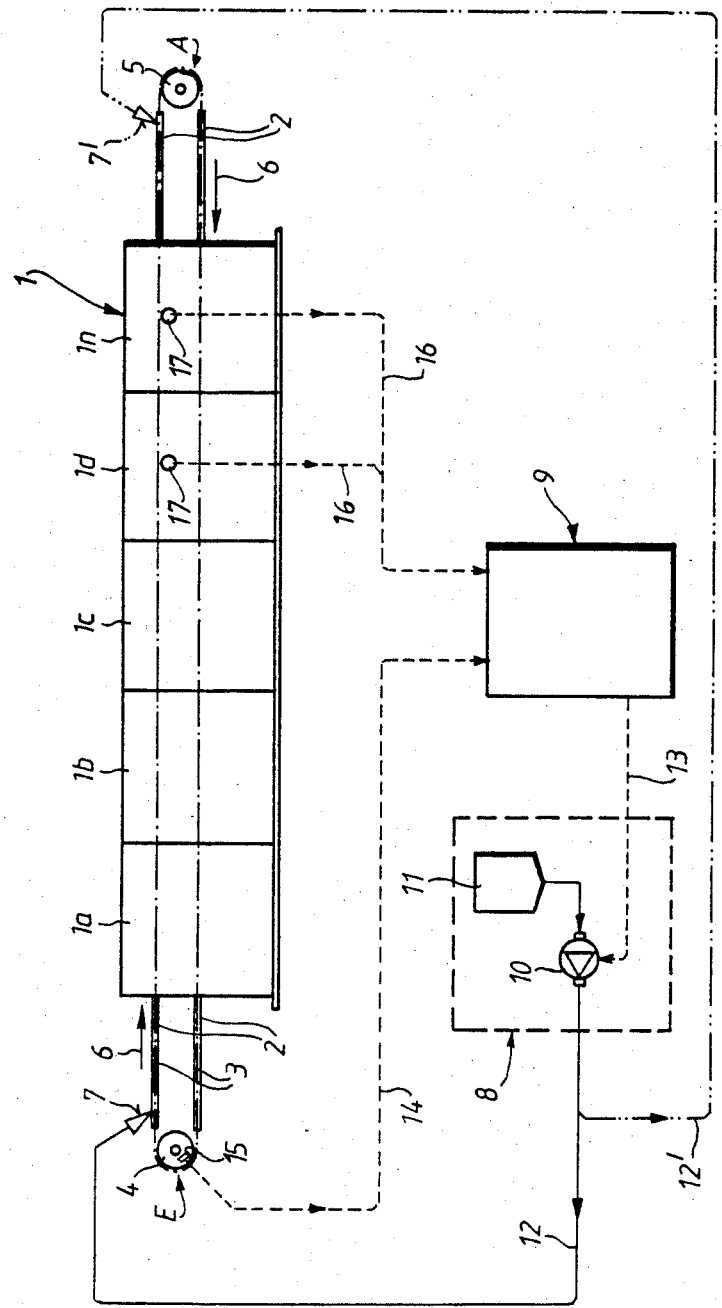
FIG. 1 shows quite schematically an overall view of a tensioning machine with apparatus for carrying out the lubrication method according to the invention.

An embodiment of the lubrication apparatus will first of all be explained with the aid of FIG. 1 in connection with a tensioning machine 1 such as is generally known for drying and fixing of lengths of textile material. This tensioning machine 1 is divided into any number of heat treatment fields 1a, 1b, 1c, 1d . . . 1n which are one behind the other (and to which a cooling section can also be connected if required) and contains—in an equally known manner—two continuously moving transport chains 2 (only indicated by dot-dash lines in FIG. 1) which are constructed and arranged so as to transport a length of textile material to be treated through the tensioning machine 1, run in guide rails 3 and at the inlet end E and at the outlet end A are guided round sprocket wheels 4 and 5 respectively one of which for example is driven by a drive which is not shown in greater detail. The chain moves round in the direction of the arrows 6.

The apparatus which belongs to the tensioning machine 1 and serves for automatic lubrication of the continuously moving material transport chains 2 or of the links thereof which are known per se and are not shown in greater detail contains at least one lubricating arrangement 7 or 7'—only indicated in FIG. 1—for each transport chain 2, a lubricant supply arrangement 8 connected to the lubricating arrangement 7 or 7' and a control arrangement 9 associated with the lubricant supply arrangement. Essential parts of the lubricant supply arrangement 8 are a feed pump 10 and a lubricant storage tank 11 linked to this pump, the feed pump 10 being connected via at least one feed pipe 12 or 12' to the lubricating arrangement 7 or 7' and to the control arrangement 9 via a control line 13.

The lubricant (preferably suitable chain oil) can be brought out in a manner which is known per se for instance in a spray mist or a spray stream, and for this purpose corresponding nozzles or the like are provided in the lubricating arrangement 7 or 7'. The lubricaing arrangements 7 or 7' are preferably arranged in each case in the region of the guide rails 3 for the transport chains outside the heat treatment chamber either only on the inlet end E of the tensioning machine (as indicated by solid lines) or, in the case of great machine lengths, at the inlet end E and at the outlet end A of the tensioning machine 1 (the latter is indicated by the dot-dash lines for 7' and the feed pipe 12').

An pulse signal counter which is contained in the control arrangement 9 and will be explained in greater detail below is connected via an pulse count signal line 14 to an pulse generator 15 which is arranged in the region of at least one of the material transport chains and counts the chain links thereof. The pulses from the pulse generator 15 which are proportional to the speed at which the chain goes round and the length of the chain are supplied as an pulse count signal to the control arrangement 9 or the pulse signal counter arranged thereon, as will be explained in greater detail below.

Figure 2:
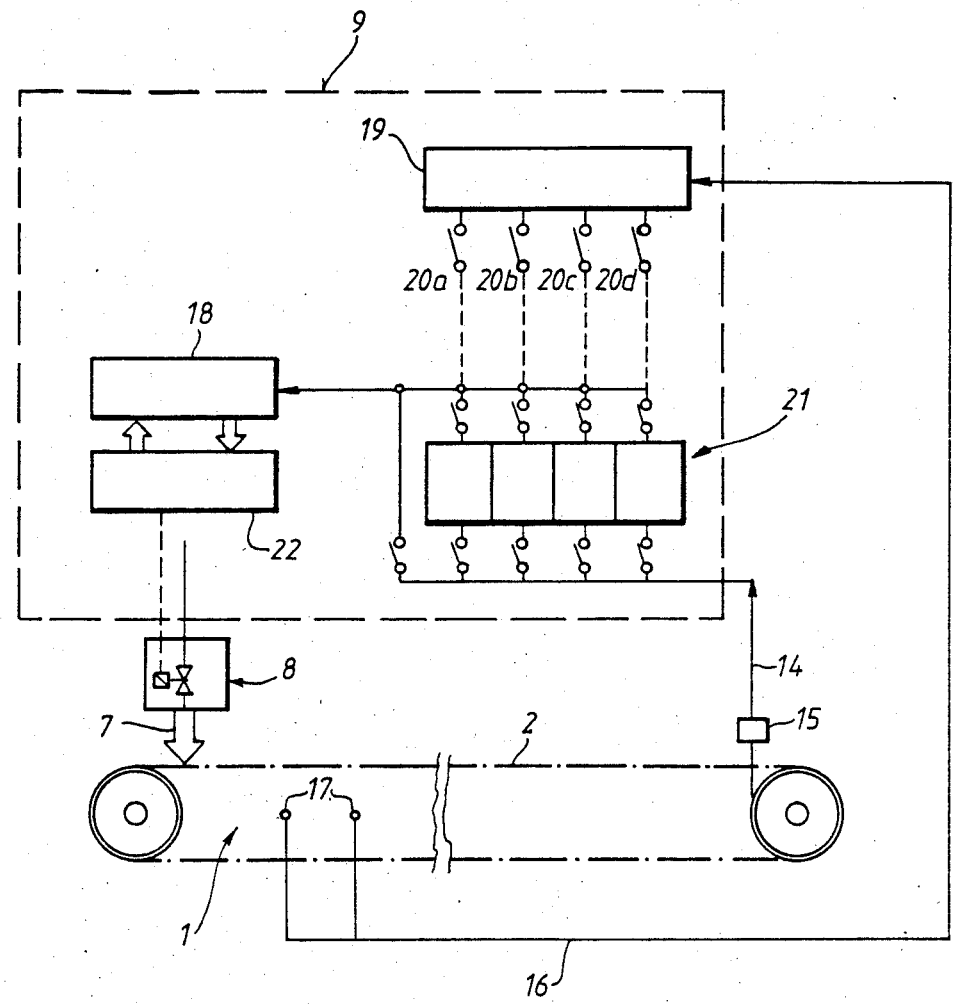
FIG. 2 shows a simplified flow diagram for further explanation of the lubrication method.

Inside the tensioning machine 1, and preferably inside the hot heat treatment fields 1d, 1n, which are located at the rear when viewed in the material transport direction, a plurality of temperature measuring elements 17 are distributed which are also connected by leads 16 to the control arrangement 9, and in fact to an indicator device provided therein which will be explained in greater detail below with the aid of FIG. 2.

The essential parts of the control arrangement 9 and the lubrication operation itself will now be described in detail with reference to the simplified flow diagram in FIG. 2.

In addition to the pulse signal counter 18 (which is connected via the pulse count signal line 14 to the pulse generator 15) already mentioned above and the indicator device 19 (which is connected to the temperature measuring elements 17 in the tensioning machine 1 by the leads 16) also already mentioned, the control arrangement 9 contains a plurality of adjustable contacts which are associated with the indicator device 19; in the present example there are four adjustable contacts 20a, 20b, 20c and 20d, an electronic switch 21 arranged between these contacts 20a to 20d and the pulse count signal line 14, and a second counter 22.

The pulse signal counter 18 is constructed as a so-called summation counter and serves for the formation of control signals for switching the lubricant supply arrangement 8 on and off. However, for control purposes this pulse signal counter 18 is not connected directly to the lubricant supply arrangement 8, but via the second counter 22 by means of which the duration of lubrication is determined and in which a complete circuit by the chain or a multiple thereof can be preset as the pulse figure (one circuit of the chain or one complete chain length can be determined extremely accurately by the number of chain links).

A chosen target figure can be preset on the pulse signal counter 18 and this target figure can be fixed by the number of links on the transport chains 2 in such a way that at a minimal working temperature (which in practice has no significant influence on an increased lubricant consumption) a specific (preset) number of chain links must pass the pulse generator 15 before the chain likns or the transport chains 2 have to be further lubricated.

However, since higher temperatures (above the minimal working temperature) generally prevail inside the tensioning machine 1 for drying and/or fixing lengths of material, the lubricant is also consumed more rapidly according to the prevailing level of the working temperature. In order to take this into account in determining the lubrication time interval, the prevailing actual value for the temperature in the treatment fields 1d, 1n is measured by means of the temperature measuring elements 17 inside the tensioning machine 1 and is supplied as a signal to the temperature indicator device 19 (via the lead 16). As a function of the existing temperature (actual value for the temperature) this temperature indicator device 19 closes one or more of the adjustable contacts 20a to 20d which are each associated with one corresponding multiplication factor and with the different temperature values. By means of the electronic switch 21 the contact 20a . . . 20d having the highest value superimposes the appertaining multiplication factor onto the pulse count signal supplied by the pulse generator 15. In this way it is not simply the pulse count signal (from the pulse generator 15), which is merely proportional to the speed at which the chain goes round, which is supplied to the pulse signal counter 18, but the product resulting from the multiplication of the pulse count signal by the multiplication factor. This means, in other words, that the pulse figure which is fixed by the pulse generator 15 and is proportional to the speed at which the chain goes round is manipulated as a function of the temperature prevailing in the tensioning machine 1 as though the transport chains 3 were going round more quickly (without this in fact being the case), which would then lead to more frequent switching on of the lubricant supply arrangement 8 and thus to more frequent lubrication of the chain links than at lower or minimal working temperatures; thus in the present example this means that at high temperatures the pulse signal counter 18 counts more rapidly and therefore reaches the present target figure more quickly (that is to say, correspondingly short lubrication time intervals).

When the preset target figure is reached on the pulse signal counter 18, the pulse signal counter 18 supplies a control signal for switching on the lubricant supply arrangement 8 to the second counter 22. The lubricant supply arrangement 8 then remains switched on until the preset pulse figure is reached on the second counter 22 corresponding—as mentioned—to the chain completing one circuit or an exact integral multiple. Lubricant is supplied to the transport chain 2 or the links thereof via the lubrication arrangement 7 (or 7') only until the target figure set on the second counter 22 is reached, whereupon the lubricant supply is shut off again by switching off the lubricant supply arrangement 8. Then the pulse signal counter 18 is also switched off by the second counter 22. After the completion of a lubricating cycle the two counters 18 and 22 are preferably reset to 0 so that a new counting cycle begins on the pulse signal counter 18 at the beginning of each lubrication time interval.

With regard to the second counter 22 it should also be mentioned that in this case for the purpose of determining the exact chain length or a complete circuit of the chain it is always the unmultiplied, i.e. direct pulse signals which are supplied by the pulse generator 15.

As can be seen from the preceding description of the apparatus and the method, optimum adjustment of the automatic lubrication can be carried out in any case and adapted to the speed at which the chain goes round and also to the prevailing temperatures inside the tensioning machine 1. Finally, in addition, reference is again made to the following advantages of this lubricating method:

provision is made for a regular and sufficient lubrication of the material transport chains, and particularly the links thereof, avoiding over-lubrication and under-lubrication;

the lubricant consumption can be reduced to an economically acceptable level by keeping to the minimum quantities necesary;

by means of a continuously reliable lubrication of all chain links and joints thereof (and also at the same time the corresponding guide rail sections) an optimum working life and easy action of the transport chains can be ensured;

the transport chains can be lubricated with any suitable lubricant;

this method of lubrication and the lubrication apparatus can also be adapted to or built onto any tensioning machine at a later stage.

I claim:

1. Method of automatic lubrication of the links of a continuously moving material transport chain in a tensioning machine for drying and/or fixing lengths of textile material, in which the chain links are counted as pulses and the pulse count signal is supplied to a counter in a control arrangement which switches on the supply of lubricant to the transport chain via the counter in each case for the duration of at least one complete circuit of the chain, and the number of chain links which define the lubrication time interval is preset in this counter, characterised in that in addition the temperature inside the tensioning machine is measured, a multiplication factor for the pulse figure which is proportional to the speed at which the chain goes round is formed from the actual value obtained for the temperature, the multiplication factor is superimposed upon the pulse count signal and the total signal resulting from the product of the multiplication factor times the pulse count signal is supplied to the counter, which emits a control signal to switch on the supply of lubricant when a predetermined target figure is reached.

2. Method as claimed in claim 1, characterised in that the temperature is measured at several temperature measuring points distributed in the tensioning machine, and higher temperatures in each case result in a higher multiplication factor and vice versa.

3. Method as claimed in claim 2, characterised in that the air temperature is measured in the tensioning machine.

4. Method as claimed in claim 2, using a tensioning machine with several heat treatment fields arranged one behind the other, characterised in that the measurement of the temperature is carried out in at least one of the last heat treatment fields.

5. Method as claimed in claim 1, characterised in that at the end of each lubricating operation the counter is reset to the starting position.

6. Apparatus for the automatic lubrication of the chain links of continuously moving material transport chains in a tensioning machine, for carrying out the method as claimed in at least one of claims 1 to 5, containing at least one lubricating arrangement for each transport chain, one lubricant supply arrangement connected to the lubricating arrangement, and one control arrangement which is associated with the lubricant supply arrangement and to which a number of pulses proportional to the speed at which the chain goes round and the length of the chain are supplied, and in this control arrangement an pulse signal counter is provided for the formation of control signals to switch the lubricant supply arrangement on and off, characterised by the following features:

(a) an pulse generator (15) which counts the transport chain links is arranged in the region of at least one transport chain (2), this pulse generator being connected to the pulse signal counter (18) which is constructed as a summation counter;

(b) in order to determine the current actual value for temperature a temperature measuring element (17)

is arranged inside the tensioning machine (1) and is connected to the temperature indicator device (19) which is provided inside the control arrangement (9) and contains several adjustable contacts (20a . . . ) which are associated with different temperature values and are each associated with a multiplication factor which can be superimposed upon the pulse count signal in the region before the pulse signal counter by means of an electronic switch (21);

(c) the pulse signal counter (18) is connected for control purposes to the lubricant supply arrangement (8) by means of a second counter (22) in which at least one complete circuit of the chain can be preset as the pulse number.

7. Apparatus as claimed in claim 6, characterised in that the pulse signal counter (18) can be preset to a chosen target figure which results from the product of the multiplication factor times the pulse count signal and supplies a control signal to the second counter (22) to switch on the lubricant supply arrangement (8) when this target figure is reached, and the lubricant supply arrangement can be switched off when the preset pulse figure is reached in the second counter.

8. Apparatus as claimed in claim 7, characterised in that the pulse signal counter (18) and the second counter (22) can be reset to zero after a lubricating cycle has been completed, the pulse signal counter being reset by the second counter.

9. Apparatus as claimed in claim 6, characterised in that inside the hot treatment fields (1d, 1n) of the tensioning machine (1) several temperature measuring elements (17) are distributed which are connected to the adjustable contacts (20a, 20b, 20c, 20d) in such a way that one or more contacts are closed as a function of the current actual values for the temperature at the measuring points and the contact for the highest value superimposes the appertaining multiplication factor for the highest value onto the pulse count signal.

* * * * *